United States Patent [19]

Speer

[11] Patent Number: 5,232,133
[45] Date of Patent: Aug. 3, 1993

[54] APPARATUS FOR CARRYING ARTICLES AND PORTABLE TABLE ATTACHABLE TO A TRAILER-HITCH BALL

[76] Inventor: William W. Speer, 1323 Eleanor Way, Sunnyvale, Calif. 94087

[21] Appl. No.: 846,897

[22] Filed: Mar. 6, 1992

[51] Int. Cl.$^5$ ............................................... B60R 7/00
[52] U.S. Cl. ..................... 224/42.001; 224/42.03 R; 224/42.03 B; 224/42.45 R; 224/917
[58] Field of Search ...................... 224/42.01, 42.03 R, 224/42.03 B, 42.07, 42.08, 42.45 R, 314, 917; 211/17, 18, 21

[56] References Cited

U.S. PATENT DOCUMENTS

| | | | |
|---|---|---|---|
| 3,448,904 | 6/1969 | Sahr | 224/42.01 |
| 3,876,123 | 4/1975 | Stuntz | 224/42.03 B |
| 3,944,179 | 3/1976 | Piper | 248/226 |
| 4,461,410 | 7/1984 | Tartaglia | 224/42.03 B |
| 4,537,443 | 8/1985 | Bray | 297/159 |
| 4,576,395 | 3/1986 | Longoria | 224/43.03 R |
| 4,640,658 | 2/1987 | Webb, Jr. | 224/42.08 |
| 4,676,414 | 6/1987 | Deguevara | 224/917 |
| 4,856,686 | 8/1989 | Workentine | 224/42.03 B |
| 4,901,896 | 2/1990 | Speer | 224/42 |
| 5,121,862 | 6/1992 | Schmidt | 224/42.03 B |

Primary Examiner—Henry J. Recla
Assistant Examiner—David J. Walczak
Attorney, Agent, or Firm—Baker & Botts

[57] ABSTRACT

An article carrier connectable to a vehicle trailerhitch ball is disclosed. The article carrier comprises a vertical support member having a horizontal support member connected to its upper end and a hitch ball receptacle attached to its lower end. Hanger arm support sleeves are attached to the horizontal support member and bike hanger arms are rotatably coupled to the hanger arm support sleeves. The bike hanger arms can be rotated to be carried in either the transport position to carry bicycles and the like or storage position. Upper and lower ski attachments can be attached to the hanger arm support sleeves and the lower end of the vertical support member, respectively, for carrying ski equipment. In addition, a table top can be attached to the vertical support member to form a table when the article carrier is detached from the vehicle.

10 Claims, 4 Drawing Sheets

APPARATUS FOR CARRYING ARTICLES AND PORTABLE TABLE ATTACHABLE TO A TRAILER-HITCH BALL

TECHNICAL FIELD OF THE INVENTION

This invention relates generally to apparatus, attachable to a vehicle, for carrying articles. More particularly, this invention relates to an article carrier to be attached to a vehicle for carrying bicycles or skis, or when not attached to a vehicle, the article carrier can be adjusted to serve as a table and umbrella stand.

BACKGROUND OF THE INVENTION

It is often desirable to be able to carry one or more bicycles or one or more sets of skis on the exterior of a vehicle. Previously developed carriers for such articles have used various types of devices for connecting the carrier to the trunk roof, and/or to the bumper of the vehicle. Other conventional carriers connect to trailer-hitches which ordinarily extend from underneath the rear bumper. (The present invention is an improved apparatus for carrying articles, such as bicycles or skis, on a carrier attached solely to a vehicle trailer hitch.)

An exemplary article carrier attachable to a vehicle is illustrated in U.S. Pat. No. 4,461,410 issued on Jul. 24, 1984 to Tartaglia. This article carrier is mountable on the draw bar of the trailer-hitch by removing the trailer hitch ball and inserting a stud through the trailer-hitch ball hole.

Another article carrier is described in U.S. Pat. No. 4,901,896 issued to Speer on Feb. 20, 1990. The Speer apparatus includes a tubular member one end of which fits over a trailer hitch ball and secured by a latch pin. The apparatus further includes a rack suited for carrying bicycles and like articles.

One example of a ski carrier attachable to a vehicle is illustrated in U.S. Pat. No. 3,944,179 issued on Mar. 16, 1976 to Piper. The ski carrier includes horizontal support bars attachable by clamps to the edge of the trunk lid of a vehicle.

Neither the Tartaglia bicycle carrier nor the Piper ski carrier are adaptable to carry both bicycles and skis. Additionally, the Tartaglia bicycle carrier can only be mounted by first removing the trailer hitch ball. The article carrier of the present invention is easily adaptable to carry either bicycles or skis by using a number of attachments. Additionally, the article carrier is attachable to the vehicle in a number of ways. A further advantage of the present invention is that the article carrier is easily adaptable to serve as a portable table and/or umbrella stand when detached from the vehicle.

A number of conventional portable tables exist, although none form part of or are capable of being carried with a vehicle article carrier. One example of a portable table is described in U.S. Pat. No. 4,537,443 issued on Aug. 27, 1985 to Bray. Bray's portable table is designed to fit within a carrying case; the carrying case itself unfolding to become the table top. Within the carrying case are table legs and bench seats. However, the Bray table cannot be attached to a vehicle, or comprise part of an article carrier attachable to a vehicle.

Since the bicycles and skis carried on the article carrier of the present invention typically are used in outdoor situations in which a table is also useful (for example, beaches, mountains and parks), the present invention is uniquely suited to a variety of recreational uses in a variety of settings. The additional utility of holding an umbrella at various angles to facilitate shading further enhances the recreational value and the comfort level of users of the preferred embodiment of the present invention. The present invention thus satisfies a long felt need for a versatile article carrier easily attachable to and detachable from a vehicle that is useful year round.

SUMMARY OF THE INVENTION

In accordance with the present invention, an article carrier is provided which substantially eliminates or reduces disadvantages and problems associated with prior apparatus.

In one aspect of the present invention, an article carrier connectable to a vehicle trailer-hitch ball is disclosed. The article carrier comprises a vertical support member having a horizontal support member connected to its upper end and coupler means for attachment to the hitch ball attached to its lower end. Hanger arm support sleeves are attached to the horizontal support member and bike hanger arms are rotatably coupled to the hanger arm support sleeves. The bike hanger arms can be rotated to be carried in either the transport position to carry bicycles and the like or to be carried in a storage position. Upper and lower ski attachments can be attached to the hanger arm support sleeves and the lower end of the vertical support member, respectively, for carrying ski equipment. In addition, a table top can be attached to the vertical support member to form a table when the article carrier is detached from the vehicle.

A primary advantage of the present invention is its utility and versatility. The article carrier can be easily configured and reconfigured as a bicycle carrier or a ski equipment carrier. In addition, it is easily attachable and detachable to the vehicle. Once arriving at the destination, the article carrier can be easily adapted as a picnic table and the like, which also holds an umbrella.

BRIEF DESCRIPTION OF THE DRAWINGS

The foregoing and additional objects and advantages of the invention will become apparent as the following detailed description is read in conjunction with the accompanying drawings. In the drawings like reference characters denote like parts in all views and wherein.

DETAILED DESCRIPTION OF THE INVENTION

Figure 1:
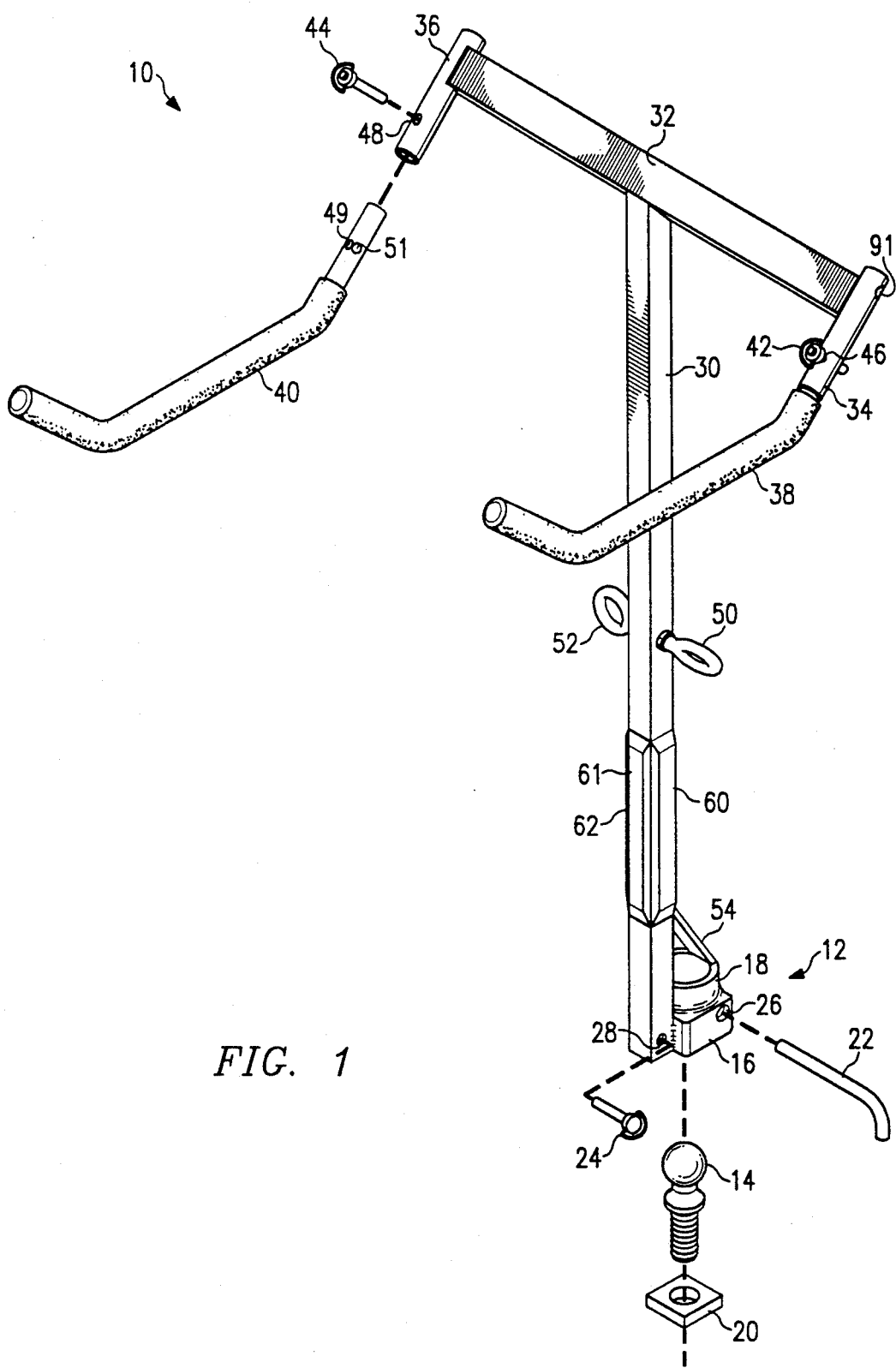
FIG. 1 is a perspective view of a preferred embodiment of the article carrier, without an attached table top and configured for carrying bicycles.

FIG. 1 illustrates a preferred embodiment of an article carrier, generally indicated at 10, constructed in accordance with the teachings of the present invention. Article carrier 10 includes a trailer hitch ball receptacle 12 constructed to fit over a trailer-hitch ball 14 attached to the rear bumper of a vehicle (not shown). Hitch ball receptacle 12 preferably includes a square base 16 and a circular portion 18. Square base 16 fits snugly over a square plate 20 located securely at the base of hitch ball 14. The snug fit of square plate 20 and square base 16 prevents any twisting of article carrier 10 with respect to hitch ball 14. Any non-round configuration of the base 16 and plate 20 can be used so long as the combination prevents rotation of the base 16 relative to the plate 20. When hitch ball receptacle 12 is positioned over hitch ball 14, it is secured by a pin 22 inserted through a hole 26 in square base 16. Pin 22, when in place, prevents hitch ball 14 from decoupling with hitch ball receptacle 12. In the preferred embodiment of the present invention, additional security may be had by attaching conventional stop devices (not shown) to pin 22 to prevent it from slipping out of hole 26. An example of such stop device may be latches which attach to both ends of pin 22 which are exposed and extend out of square base 16.

Hitch ball receptacle 12 is coupled to a vertical support member 30. Attached to vertical support member 30 at the opposite end from hitch ball receptacle 12 is a horizontal support member 32. A hole 28 located at the base of vertical support member 30, receiving a quick release pin 24, is provided for securing a number of attachments onto article carrier 10 as described in detail below.

Horizontal support member 32 and hitch ball receptacle 12 preferably are welded to vertical support member 30. Horizontal support member 32 has at least one, and preferably two or more hanger arm support sleeves 34 and 36 extending from horizontal support member 32. Hanger arm support sleeves 34 and 36 extend preferably at roughly a 45° angle from vertical support member 30 when in the transport configuration as shown in FIG. 1. Hanger arm support sleeves 34 and 36 preferably are welded to horizontal support member 32.

Each hanger arm support sleeve 34 and 36 is adapted to receive bike hanger arms 38 and 40, respectively. Bike hanger arms 38 and 40 are securely attached to hanger arm support sleeves 34 and 36 by quick release pins 42 and 44, respectively, passing through holes 46 and 48 in hanger arm support sleeve 34 and 36 and aligned holes 49 (only one shown) on bike hanger arms 38 and 40. A second set of holes 51 (only one shown) on bike hanger arms 38 and 40 are provided for a slight adjustment of bike hanger arm positions, useful for an additional utility of article carrier 10, to be described in more detail below. A soft protective padding made of materials suited for this purpose is preferably used to wrap bike hanger arms 38 and 40. Bike hanger arms 38 and 40 are generally curved in a predetermined configuration and are rotatable 180° within the hanger arm support sleeves 34 and 36 such that bike hanger arms 38 and 40 may project outwardly or inwardly in relation to vertical support member 30. When rotated to project outward, bike hanger arms 38 and 40 are generally perpendicular to vertical support member 30 as shown in FIG. 1. The outward projection of bike hanger arms 38 and 40 will be referred to as the "transport position."

Figure 3:
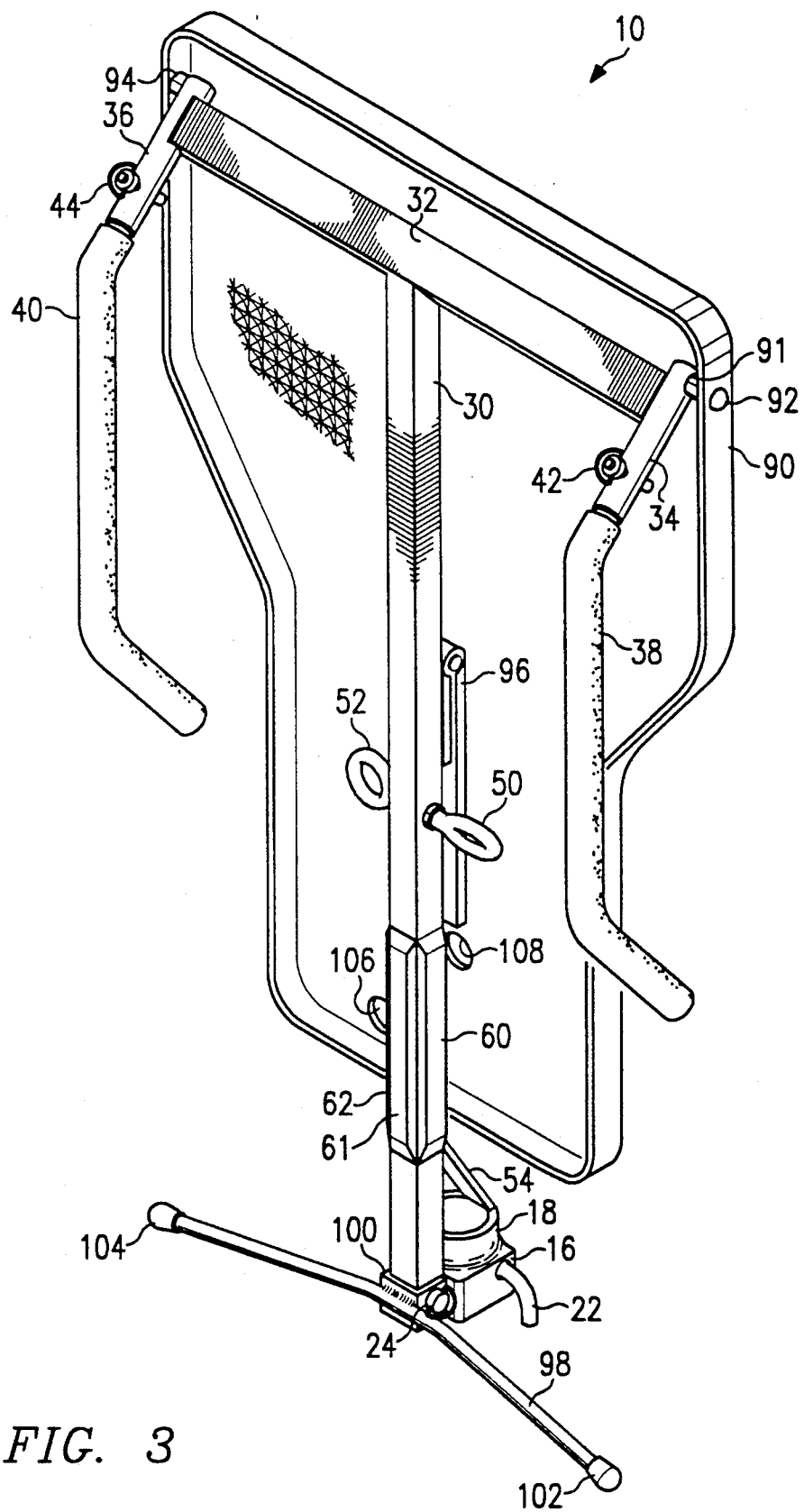
FIG. 3 is a perspective view of a preferred embodiment of the article carrier, with an attached table top, configured, for attaching to a vehicle.

The transport position is used when bicycles are to be carried. On the other hand, inward projection of the bike hanger arms 38 and 40 as shown in FIG. 3, is recommended to store article carrier 10 in a more convenient and compact manner. The inward projection of bike hanger arms 38 and 40 will be referred to as the "storage position." The storage position is achieved by rotating bike hanger arms 38 and 40 180° and again securing with quick release pins 42 and 44.

Also attached to vertical support member 30 at a position preferably halfway between hitch ball receptacle 12 and horizontal support member 32 is at least one, and preferably two or more, tie down rings 50 and 52. As can be seen in FIG. 1, tie down ring 52 is oriented vertically while ring 50 is oriented slightly askew for reasons more apparent described below. Tie down rings 50 and 52 also function as umbrella shaft supports as described in more detail hereinafter. Tie down rings 50 and 52 are preferably welded to vertical support member 30.

A tying loop 54 is welded to vertical support member 30 at the end near hitch ball receptacle 12. Using the tying loop 54 and the tie down rings 50 and 52, bicycles and other articles which are carried on article carrier 10 may be tied securely thereto using any one of several commonly available ties, such as rope, bungie cords, etc. If desired, a security cable (not shown) can be threaded through the loop 54 and locked to the vehicle to prevent theft of the carrier and any article thereon. As an added protective feature in case of potential jostling causing potential damage to any carried articles, vertical support member 30 is preferably covered at appropriate locations with protective padding strips 60-62, preferably positioned as shown in FIG. 1.

Figure 2:
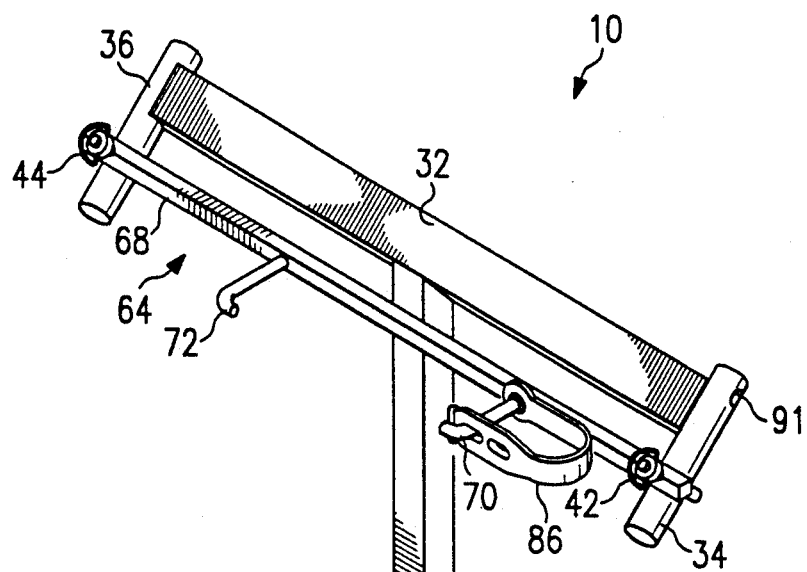
FIG. 2 is a perspective view of a preferred embodiment of the article carrier, without an attached table top, configured to carry skis.
Figure 2:
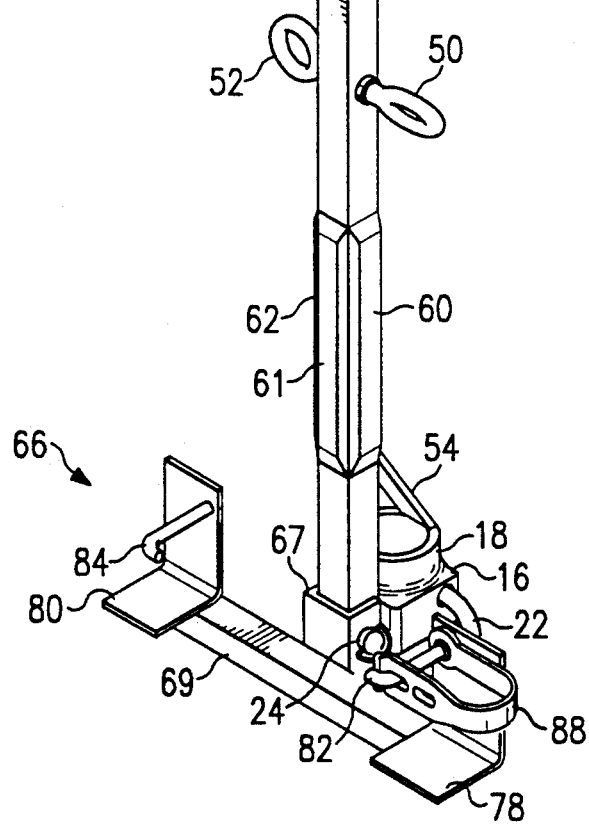

FIG. 2 is a perspective view of article carrier 10 configured to carry skis (not shown). For ease and clarity in the descriptions herein, like reference numerals will be used to refer to like elements in FIGS. 1-4 Detailed descriptions of such like elements will not be repeated and certain elements may be omitted in one or more views to avoid cluttering of the drawing figures. Article carrier 10 is shown having upper and lower ski attachments 64 and 66 attached to opposing ends of vertical support member 30. Upper ski attachment 64 comprises an upper horizontal bar 68 of an appropriate width attachable to hanger arm support sleeves 34 and 36 by inserting quick release pins 42 and 44 through aligned holes 46 and 48 and holes in upper horizontal bar 68. When carrying skis, bike hanger arms 38 and 40 are preferably removed from hanger arm support sleeves 34 and 36, although this is not required.

Lower ski attachment 66 includes a horizontal member 69 attached to a coupler 67 which is fitted over the end of vertical support member 30 and secured by quick release pin 24. Upper and lower ski attachments 64 and 66 additionally comprise specially constructed fixtures for holding the skis (not shown) securely. Upper ski attachment 64 includes one or more J-posts 70 and 72 coupled to and protruding outwardly from upper horizontal bar 68. Preferably J-posts 70 and 72 are oriented perpendicularly with respect to vertical support member 30. Similarly, lower ski attachment 66 comprises angular fixtures 78 and 80 coupled to horizontal member 69 with J-posts 82 and 84 protruding therefrom. Angular fixtures 78 and 80 are preferably constructed from plates bent at right angles, with one portion thereof parallel to vertical support member 30 and the other portion extending perpendicularly with respect to vertical support member 30. Angular fixtures 78 and 80 are preferably welded to lower ski attachment horizontal member 69. J-posts 82 and 84 similarly and preferably extend from angular fixtures 78 and 80 perpendicularly with respect to vertical support member 30.

J-posts 70, 72, 82 and 84 are used to provide securing points for elastic bands 86 and 88. Elastic bands 86 and 88 are preferably constructed of rubber or a combination of materials having similar elastic properties. As shown in FIG. 2, elastic bands 86 and 88 are constructed of a strip of elastic material and having one hole at each end. Additional holes may be provided at predetermined locations to modify the effective fastening length thereof. A tab is further provided at one end to facilitate grasping the end thereof.

It is contemplated that J-posts 70 and 82 and corresponding elastic bands 86 and 88 hold one set of skis or ski poles (not shown). It is further contemplated that appropriate cushioning material (not shown) may be provided at predetermined locations, such as the inner surfaces of angular fixtures 78 and 80, to protect the ski equipment.

Figure 4:
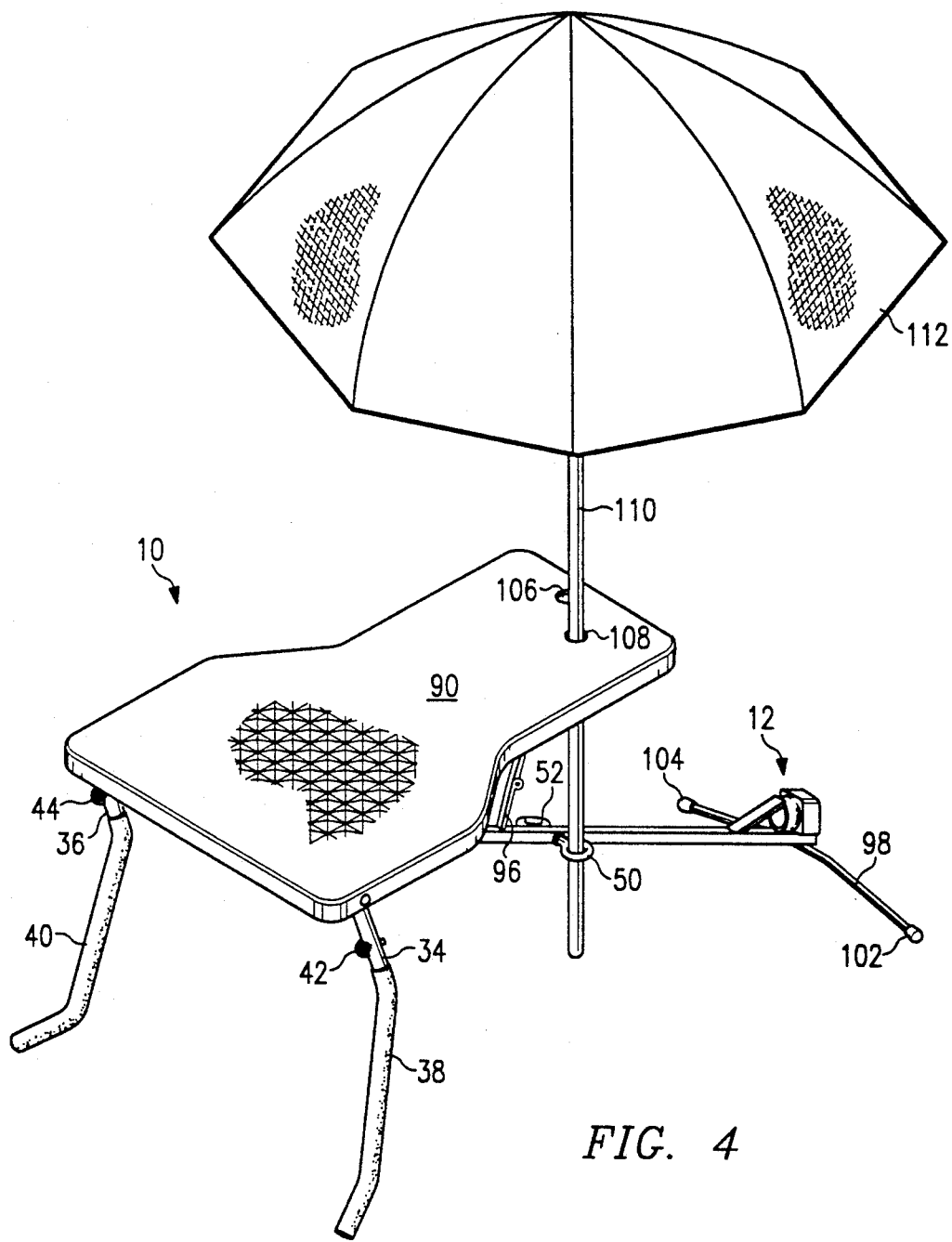
FIG. 4 is a perspective view of the preferred embodiment of the article carrier serving as a table with an umbrella.

FIGS. 3 and 4 show article carrier 10 with an attachable table top 90. Table top 90, preferably made of plastic grating, wood, or other suitable material, is pivotally attached to each hanger arm support sleeve 34 and 36 by bolts 92 and 94 secured into holes 91 in both hanger arm support sleeves 34 and 36. The table top 90 when constructed from a plastic grating material may have advantages over one made of wood or other materials since the wind resistance while the vehicle is in motion will be reduced and the weight of article carrier 10 would be minimized. Bolts 92 and 94 in effect from a pivoting hinge for table top 90.

About mid-way down vertical support member 30 is a conventional drop leaf hinge 96 which connects vertical support member 30 to table top 90. Drop leaf hinge 96 permits table top 90 to be adjusted to be parallel with vertical support member 30, as shown in FIG. 3 or to be expanded in a second configuration as shown in FIG. 4. Top 90 is in the first position when article carrier 10 is in the transport position. Table top 90 is located in the second position when article carrier 10 is used as a table. Table top 90 is put into and restrained in the horizontal position for use as a table by pulling table top 90 away from vertical support member, 30, the action of which extends drop leaf hinge 96 into a locked position.

When carrier 10 is to be used as a table, bike hanger arms 38 and 40 are turned 180° so that they extend outwardly from under table top 90 serve as legs for the table top 90. In particular, the second set of holes 51 in bike hanger arms 38 and 40 are used to receive pins 42 and 44. This provides a broader and more stable base for table top 90. A table support bar 98 is attached to a coupler 100 which enables it to be coupled to vertical support member 30 with quick release pin 24. Preferably table support bar 98 is welded to coupler 100 to provide a secure coupling. Preferably table support bar 98 includes end covers 102 and 104 constructed from plastic, rubber or similar suitable materials, which cover the ends of table support bar 98 and provide additional cushioning. Table support bar 98 serves as short legs to stabilize table top 90 when it is in the position shown in FIG. 4.

Table top 90 contains two holes 106 and 108 of a size suitable for receiving a pole such as an umbrella pole 110 having an umbrella 112 attached thereto. The two holes 106 and 108 are positioned in relation to tie down rings 50 and 52 in a manner that the pole 110 stands either vertically with respect to the ground (as shown in FIG. 4) or at an angle.

PREFERRED OPERATION OF THE PRESENT INVENTION

Article carrier 10 preferably is attached to a vehicle (not shown) by inserting the trailer-hitch ball 14 into square base 16 of hitch ball receptacle 12 and secured by pin 22. Bike hanger arms 38 and 40 should be positioned in the transport position, as shown in FIG. 1. In the transport position, the bike hanger arms 38 and 40 should be carried roughly parallel to the ground when installed on the vehicle. If not already extending outward, bike hanger arms 38 and 40 can be rotated 180° to the transport position by removing quick release pins 42 and 44, rotating bike hanger arms 38 and 40 to the transport position, aligning holes 46, 48 and 49, and reinserting quick release pins 42 and 44. One or more bicycles (not shown) then can be balanced on bike hanger arms 38 and 40 and secured in place using any one of several commercially available ties. The selected ties can be tied to the bicycles and to article carrier 10 by using tie down rings 50 and 52 and/or tie down loop 54.

To carry skis (not shown) bike hanger arms 38 and 40 preferably should be removed, but this is not required. Upper ski attachment 64 is attached to hanger arm support sleeves 34 and 36 by inserting quick release pins 42 and 44 through the aligned holes 46 and 48 in hanger arm support sleeves 34 and 36 and upper ski attachment 64. Upper ski attachment 64 should be attached such that J-posts 70 and 72 extend away from vertical support member 30. Table support bar 98 is removed from article carrier 10 and lower ski attachment 66 attached in its place by means of latch pin 24. Lower ski attachment 66 should be attached such that J-posts 82 and 84 extend away from vertical support member 30. Elastic bands 86 and 88 may then be attached to J-posts 70 and 82, as shown in FIG. 2, and be extended around a set of skis or ski poles (not shown) The ends of the skis rest in angular fixtures 78 and 80 on lower ski attachment 66.

To use article carrier 10 as a table, it is first detached from the vehicle. Bike hanger arms 38 and 40 are positioned in an outwardly extending direction as shown in FIGS. 3 and 4 using holes 51 in bike hanger arms 38 and 40. Bike hanger arms 38 and 40 provide support and serve as legs for table top 90. Table support bar 98 is attached to vertical support member 30 by the use of quick release pin 24. Table top 90 is pulled away from vertical support member 30 and locked into place by fully extending drop leaf hinge 92. In this manner, table top 90 is capable of sitting horizontally, supported by bike hanger arms 38 and 40 and table support bar 98.

If it is desirable, an umbrella may be passed through one of the holes 106 or 108 in table top 90 and through one of the tie down rings 50 and 52. Tie down rings 50 and 52 are attached to vertical support member 30 at varying angles with respect to table top 90. The spacing and location of holes 106 and 108 in table top 90 can be determined to enable umbrella pole 110 to be positioned at varying angles with respect to table top 90 and also enable umbrella 112 to be varyingly oriented above table top 90. Thus the shape and position of the shadow cast by umbrella 112 will then vary depending on the angle at which the umbrella is held. Additionally, umbrella 112 can be similarly tilted to minimize the effect of strong wind thereon.

From the foregoing it is readily apparent that the present invention is suited to a range of uses including carrying bicycles or skis on the back of a vehicle, and as a portable table which additionally may be used as an umbrella holder. Article carrier 10 can be adjusted quickly and easily by attaching and removing a number of practical attachments to serve any one of these purposes. In addition, article carrier 10 itself is designed to be sturdy and reliable, yet compact and easily carried or stored.

It will be understood that the foregoing detailed description is presented by way of example only and that many changes and modifications can be made thereto without departing from the spirit or scope of the invention.

What is claimed is:

1. An article carrier connectable to a vehicle comprising:
   a support member having a top and bottom ends and means for attaching said support member to said vehicle in a substantially vertical position with respect to said vehicle;
   a horizontal support member connected perpendicularly to said top end of said support member;
   at least one hanger arm support sleeve connected to said horizontal support member; and
   at least one bike hanger arm attachable to each said hanger arm support sleeve, each bike hanger arm being rotatably adjustable into one of transport and storage positions wherein said bike hanger arm is rotated approximately 180° within said hanger arm support sleeve so that it extends substantially downwardly in said storage position.

2. The article carrier of claim 1 further including:
   a table top; and
   a drop leaf hinger pivotally connecting said table top to said support member.

3. The article carrier of claim 2 further comprising a table support bar attachable to said bottom end of the support member and operable to support said table top in a horizontal position.

4. The article carrier of claim 3 wherein said table top is expandable away from said support member, and being supported by said bike hanger arms when said bike hanger arms are in an outwardly extended position and said table support bar.

5. The article carrier of claim 4 wherein said table top defines at least one hole for receiving an umbrella pole of an umbrella.

6. The article carrier of claim 5 wherein said umbrella pole passes through said hole and through a tie down ring which is attached to said support member.

7. An article carrier connectable to a vehicle comprising:
   a support member having a top and bottom ends and means for attaching said support member to said vehicle in a substantially vertical position with respect to said vehicle;
   a horizontal support member connected perpendicularly to said top end of said support member;
   at least one hanger arm support sleeve connected to said horizontal support member;
   at least one bike hanger arm attachable to each said hanger arm support sleeve, each bike hanger arm being rotatably adjustable into one of transport and storage positions wherein said bike hanger arm is rotated approximately 180° within said hanger arm support sleeve so that it extends substantially downwardly in said storage position;
   a top ski attachment attachable to said top end of said vertical support member; and
   a bottom ski attachment attachable to said bottom end of said vertical support member.

8. The article carrier of claim 7 wherein said top ski attachment comprises:
   at least one J-post attached thereto and extending outwardly from said support member; and
   a fastener adaptable for forming a loop detachably secured to said J-post.

9. The article carrier of claim 8 wherein said bottom ski attachment comprises:
   at least one J-post attached thereto and extending outwardly from said support member; and
   a fastener adaptable for forming a loop detachably secured to said J-post.

10. An article carrier connectable to a vehicle comprising:
    a support member having upper and lower ends including means located at said lower end for attaching said support member to a trailer-hitch ball on a vehicle in a substantially vertical position with respect to said vehicle;
    a horizontal support member connected perpendicularly to said upper end of said support member;
    at least two hanger arm support sleeves connected to said horizontal support member;
    at least two bike hanger arms adjustably attachable to each said hanger arm support sleeve and rotatable within said hanger arm support sleeves and wherein each arm is to be configured selectively rotated from a first position substantially parallel to said support member to a second position substantially perpendicular to said support member;
    a pivot attachment means on said horizontal support member;
    a table top, pivotally connectable to said pivot attachment means;
    lower attachment means on said lower end of said support member;
    a table support bar removably attachable to said lower attachment means of said support member and adapted to extend substantially perpendicular thereto; and
    means on said support member for leveling said table top;
    upper and lower ski attachments removably attachable to said sleeves and lower attachment means, respectively for carrying ski equipment whereby said carrier can be used as a bike carrier by attaching said bike hanger arms to said sleeves and rotating said bike hanger arms to a position substantially perpendicular to said support member and used as a ski carrier by attaching said upper and lower ski attachments to said sleeves and lower attachment means, respectively, or used as a table by attaching said table top to said pivot attachment means, attaching said table support bar to said lower attachment means and removing said carrier from said vehicle.

* * * * *

UNITED STATES PATENT AND TRADEMARK OFFICE
CERTIFICATE OF CORRECTION

PATENT NO. : 5,232,133
DATED : Aug. 3, 1993
INVENTOR(S) : William W. Speer

It is certified that error appears in the above-identified patent and that said Letters Patent is hereby corrected as shown below:

Column 4, Line 29, after "FIGURES 1-4" insert --.--

Column 5, Line 24, delete "from" and insert --form-- .

Column 5, Line 37, after "support member" delete "," .

Column 6, Line 31, after "shown)" insert --.--

Column 7, Line 27, delete "hinger" and insert --hinge-- .

Signed and Sealed this

Eighth Day of March, 1994

*Attest:*

BRUCE LEHMAN

*Attesting Officer*     *Commissioner of Patents and Trademarks*